Nov. 21, 1939.          F. TENCH          2,180,486
WELDED SKELETON JOIST OR TRUSS
Filed April 29, 1936

INVENTOR
FREDERICK TENCH
BY
Townsend+Decker
ATTORNEYS.

Patented Nov. 21, 1939

2,180,486

UNITED STATES PATENT OFFICE 2,180,486

WELDED SKELETON JOIST OR TRUSS

Frederick Tench, White Plains, N. Y., assignor to L. T. Corporation, Exchange Place, Hudson County, N. J., a corporation of New Jersey Application April 29, 1936, Serial No. 76,876

2 Claims. (Cl. 189—37)

This invention relates to skeleton joists or girders or other similar open work or skeleton constructions wherein a pair of main members occupying, in a girder or joist, the position of longitudinal members are united structurally by a number of crossing members extending from one to the other to produce an open work construction suitable for use in various locations, but primarily designed for use in a skeleton girder or joist.

The general object of the invention is to secure a structure of the desired strength or rigidity with a maximum of economy in the weight of material employed to produce the finished structure.

In the preferred form of my invention, the main or longitudinal members are in the form in cross section of angle bars to one angle or flange of which the crossing members of the structure are united in a homogeneous weld, preferably by the electrical resistance welding method wherein pressure is applied to the elements by suitable pressure dies that furnish also the means of applying heating electric current to the work. In its preferred form the invention embodies diagonal uniting members extending from one longitudinal to another and crossing one another in the space between said longitudinals, the said members at crossings being united in a homogeneous or autogenous electric weld which is flush with the general plane of said united members on both faces of the structure, or in other words, occupies a common plane with the plane of said united members on both faces of the structure, that is, occupies a common plane with the plane of said crossing members themselves.

The invention will be described in its application to a skeleton joist or girder from which description the manner of utilizing the invention in other forms of metal work of a different description will be readily understood.

In the accompanying drawing showing a practical embodiment of the invention:

Figure 1:
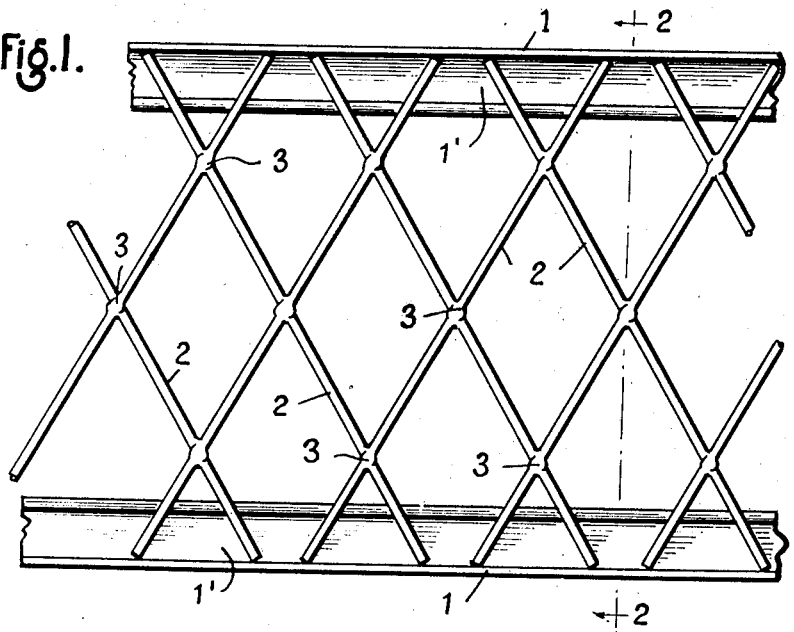
Fig. 1 is a side elevation of a portion of a structure embodying my invention.
Figure 2:
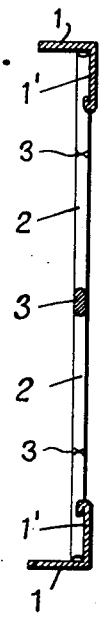
Fig. 2 is a vertical cross section on the line 2—2 of Fig. 1.

Referring to the drawing, 1, 1' indicate two angle bars or rods which are of the flanged form and which, in the completed structure, occupy the relation to one another of the chords of a joist or girder, when the invention is embodied in that type of structure. 2 indicates members which are united to the members 1, 1' and extend diagonally from one to the other thereof. Said members 2 cross one another and are integrally united to one another at the points 3 in an autogenous or homogeneous welded joint which is preferably so made that the joint itself shall be flush with the common plane in which both crossing members are situated, as indicated in the cross section, Fig. 1 and Fig. 4. At or near their ends, the members 2 are united by welding to a flange 1' of said bars 1. This union is shown in detail in Fig. 5 and is made by autogenously welding the sides of the members 2 to the flange 1' of member 1. To aid in the welding, which is preferably an electrical resistance weld, although other kinds of welds may be used, said flange 1' has its edge, where engaged by the members 2, enlarged or turned up to afford a greater mass of welding material and which likewise in the welding operation affords electrical resistance at said point of union for causing material to heat preparatory to or during the welding, produced by pressure applied to the heated work by suitable dies, as well understood in the art. Said upturned edge of flange 1' also furnishes additional material at the point of union for strengthening the structure at that point. The welded union of the members 2 and 1 is shown in the cross section Fig. 5.

Figure 3:
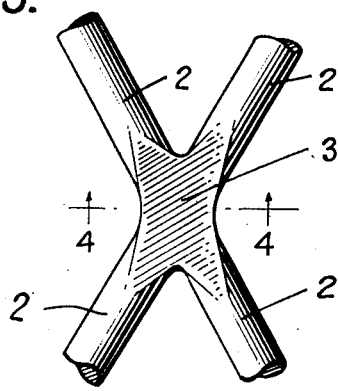
Fig. 3 is a plan of one of the homogeneous welded unions uniting crossing members to one another.
Figure 4:
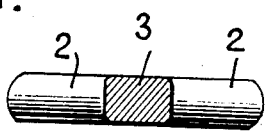
Fig. 4 is a section through the crossing members on the line 4—4 of the union Fig. 3.
Figure 6:
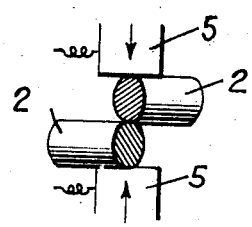
Fig. 6 shows two crossing members as assembled for union at their crossing by a welding process to be presently described.

As will be readily understood, the formation of the joint by the electric resistance method gives a practical autogenous union of said members 2 and 1 and avoids the necessity of employing special fastening devices at this part of the structure. The material at the point of union may be simply turned up into a plane transverse to the plane 1' preparatory to the welding, or might be folded over as indicated, since the purpose is simply to afford increased electrical resistance at this point of the union as well as to strengthen the joint of the finished weld or union. As will be seen, the diagonally disposed members 2 occupy the position of the web members of a girder in which the members 1 constitute the longitudinals or chord members. The autogenous or integral union at the crossing of the diagonal members 2 may be effected by the electric resistance and the pressure method by simply assembling the members 2 at the crossing in the relation to one another as in Fig. 6 and then applying heating current and pressure by means of the welding dies 5 until the members 3 are brought into a common plane with one another and with the general plane occupied by them in the finished structure as indicated in Figs. 4, 7 and 3.

Figure 7:
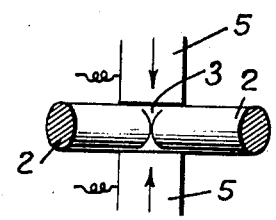
Fig. 7 shows the position of said crossing members after the welding or union has been effected by an electric welding process which is preferably employed.

As will be understood, the pressure of the dies is continued until their movement toward one another is stopped by the unheated or unsoftened portion of the members 2 as indicated in Fig. 7. A flattening out of each member 2 in the direction of its longitudinal axis may take place to a greater or lesser extent to the end that the softened or welded portion of the metal in said members 2 will merge in the undeformed portion of the member 2 and will lie within the general plane of the crossed members on both sides or faces of the structure so that neither surface of the finished structure will offer an obstruction to movement of objects over its face.

My invention so far as the finished structure is concerned may be obviously realized in other structural work other than forms that may be briefly designated as a joist or girder. In the case of a joist employed in a wall or partition it will be seen that the joint being flush on both sides of the structure with the crossing members, the structure will have minimum thickness with maximum strength at the joint and the structure when in place in a building or partition will add substantially nothing to the thickness of the wall, when the joist is employed as a studding for carrying a finishing wall surface. Owing to the union of the crossing members in an autogenous joint as described, the structure possesses a great degree of strength for little weight of material. Obviously the form of the longitudinal member 1 in an angle bar or rod, affording by one flange, a union of the members 3 by the sides with said flange, conduces to strength of structure with little weight of material.

I do not limit myself to the use of an angle bar 1 of the specific configuration illustrated but can use any form which will afford the flange 1' for union with a side of the diagonal crossing members 2, which themselves are united in the joint 3. Any form of or method of producing the weld referred to as autogenous or homogeneous weld might be employed without departing from my invention, which, as may be seen, is devoid of attached mechanical fastening devices for uniting the various members with one another which devices add to the cost and are liable to become detached in handling or use. While I have described and shown the members 1 as longitudinals, which are substantially parallel to one another and would occupy that relation in some forms of metal work, it will be understood that the said members 1 might be disposed in other relations to one another than one of exact parallelism without departing from my invention.

Figure 5:
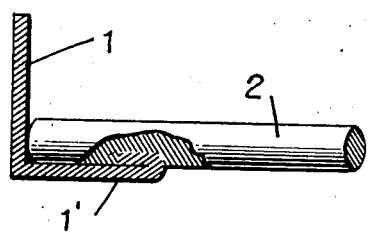
Fig. 5 is a section showing through one of the longitudinals at the place of union thereof with one end of a transverse member which is similarly united at its opposite end to another longitudinal.

As illustrated in Figs. 1 and 5 the ends of the crossing members 2 abut against or are engaged with the horizontal legs of the angle bars 1 whereby these ends are supported by said horizontal legs which is of importance in the event that any of the electric welds of the members 1 to the enlarged edges of the flanges 1' should be defective or become loose.

The invention claimed is:

1. A skeleton joist or girder having a pair of chords or longitudinals spaced apart and comprising L-shaped beams the vertical members of which are provided with enlargements on their edges and diagonal web members crossing one another and integrally united at their intersections by homogeneous welds, said cross members also being welded to the aforesaid enlargements on said vertical members and having their ends abutting against the horizontal members of said L-shaped longitudinals.

2. A skeleton joist or girder having a pair of chords or longitudinals spaced apart and comprising L-shaped beams the vertical members of which are provided with turned up edges and web members of substantially the same cross-sectional area crossing one another and integrally united at their intersections by homogeneous and autogenous welds, said web members being welded to the aforesaid turned up edges on said vertical members of said L-shaped longitudinals and lying in flat engagement with the surfaces of said vertical members with the ends of said web members engaging the horizontal members of the longitudinals.

FREDERICK TENCH.